UNITED STATES PATENT OFFICE.

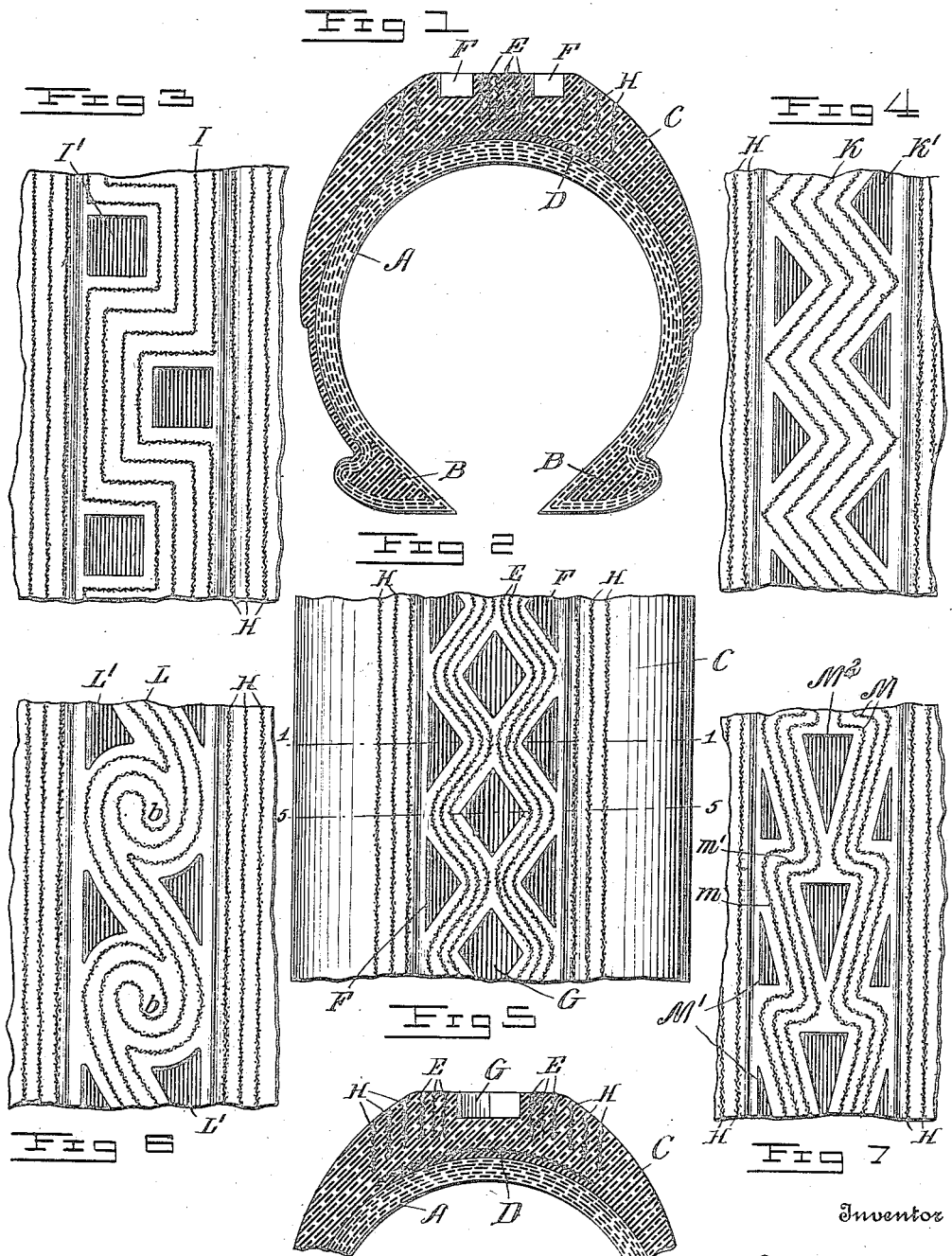

WARREN B. BUCKLEY, OF WASHINGTON, DISTRICT OF COLUMBIA.

PNEUMATIC TIRE.

1,182,634.

Specification of Letters Patent.

Patented May 9, 1916.

Application filed April 9, 1915. Serial No. 20,211.

*To all whom it may concern:*

Be it known that I, WARREN B. BUCKLEY, a citizen of the United States, residing at Washington, in the District of Columbia, have invented certain new and useful Improvements in Pneumatic Tires; and I do hereby declare the following to be a full, clear, and exact description of the same, reference being had to the accompanying drawings, forming part of this specification, and to the figures and letters of reference marked thereon.

This invention relates to resilient tires and more especially to tires of the pneumatic type having a body portion for resisting bursting strains and a tread portion for resisting road wear and any tendency of the tire to slip or slide on the surface of the roadway. A tire adapted to resist slipping or sliding on the surface of the roadway is ordinarily defined as a non-skid tire, and it is one of the objects of the present invention to provide a tire which will have exceptionally good wear resisting and non-skidding qualities.

Referring to the accompanying drawings,—Figure 1 is a cross section through a vehicle tire of the pneumatic type embodying the present invention, the section being substantially on the line 1—1 of Fig. 2. Fig. 2 is a plan view of a short section of the tire shown in Fig. 1. Figs. 3, 4, 6 and 7 are plan views of fragments of the tread portions of tires showing various modifications of the means for imparting anti-skid qualities to the tire and for resisting wear. Fig. 5 is a detail transverse section substantially on the line 5—5 of Fig. 2.

Like letters of reference in the several figures indicate the same parts.

The body portion of the tire adopted for illustrating the present invention is shown of a more or less conventional form or construction; that is to say, it has incorporated therein a series of layers of fabric A which extend concentrically around the chamber formed by the walls of the body portion, and the said body portion terminates at the inner side in beads B which serve to retain the tire in place on its rim. The layers of fabric A and the body material of the tire which may conveniently be rubber are vulcanized together and form the base for the support of the tread portion of the tire. This tread portion, which is indicated generally by the reference letter C is preferably composed of a body material of a highly resilient character such as vulcanized rubber and it extends down around the sides of the body portion to any preferred or desired extent. At the inner side of the tread portion there is located a breaker strip D of suitable fabric which may be of conventional and known construction, but it preferably curves to substantially conform to the curvature of the layers of fabric A in the body portion.

In order to impart anti-skid and wear resisting qualities to the tread portion of the tire, it is, in accordance with the present invention, provided with a series of spaced layers of fabric arranged edgewise with relation to the tread surface and extending continuously around the tire or longitudinally of the tread. These spaced layers of fabric are deflected laterally at closely adjacent points in their length and thus form as it were sinuous layers which preferably preserve their symmetrical arrangement. Inasmuch as the edges of the layers of fabric extend to the tread surface they are continuously presented to the surface of the roadway, and owing to their sinuous arrangement, portions presented to the roadway at all times extend at such angles with respect to the plane of the tire or wheel, that it is practically impossible for a sliding action to take place without moving a plurality of layers of fabric over the roadway transversely of the plane of the layers at that point, thus interposing the greatest resistance to such movement. The effect desired is preferably augmented by forming in the tread portion a series of suction chambers arranged in the sinuses of the layers of fabric. The result of the preferred construction is in effect to provide a tire, the tread surface of which is formed as it were by projecting portions and depressed portions, the projecting portions having incorporated therein spaced layers of fabric arranged edgewise with respect to the tread surface and extending outwardly to the surface of said projecting portions.

In the drawings, as shown in Figs. 1, 2 and 5, the longitudinally extending sinuous layers of fabric arranged edgewise with respect to the tread surface are indicated at E, and the suction chambers which are arranged alternately on the outer sides of and between the middle layers of fabric are indicated at F and G, respectively. On the outer sides of the sinuous layers of fabric and suction chambers, the tread portion of the tire is provided with substantially straight layers of fabric H extending continuously around the tire, so as to give additional strength and to prevent lateral rupture of the resilient material. The layers of fabric which are arranged edgewise with respect to the tread surface are preferably single layers each separated from the adjacent layers by a considerable body of resilient tread material and in the manufacture of the tire the layers of fabric and tread material are duly united while the tread material is in a more or less plastic condition, and the whole is then vulcanized in the usual way. Obviously the sinuous arrangement of the layers of fabric in the tread portion of the tire may be varied considerably, and in Figs. 3, 4, 6 and 7, different arrangements are illustrated.

In Fig. 3 the sinuous layers of fabric indicated by I in this instance extend short distances longitudinally of the tread and are then bent to extend transversely of the tread and again bent to extend longitudinally of the tread, these bends recurring at short intervals leaving alternately and on opposite sides of the center line of the tread sinuses in which the suction chambers I' are located.

In Fig. 4, the sinuous layers of fabric are indicated by the reference letter K, and in this instance they zigzag back and forth across the face of the tread, leaving sinuses in which triangular or other suitably shaped suction chambers K' are located.

In the arrangement shown in Fig. 6, the sinuous layers of fabric indicated by L extend in the form of scrolls, some of the layers being doubled back upon themselves in loop-like formation indicated at $b$, and between the lateral curves of the scrolls are sinuses in which the suction chambers L' are located.

In Fig. 7 the sinuous layers of fabric M are arranged in groups on opposite sides of the median line of the tread, as in Fig. 1, and extend in step-like formation with inwardly converging portions $m$ and outwardly converging portions $m'$, thus leaving sinuses in which the suction chambers M' and $M^2$ may be located, the suction chambers M' being on the outer sides of the layers of fabric, and the suction chambers $M^2$ between the intermediate layers.

In every instance it will be noted that the tread surface presents to the surface of the roadway a series of sections of layers of fabric with the layers extending in different directions in the several sections, so that a skidding movement in practically any direction will be resisted by a succession of layers of fabric extending transversely to the direction of the movement.

By extending the sinuous layers of fabric continuously around the tire the strength of the tread portion is increased and there is little likelihood or danger of the layers of fabric being torn from their positions. The fabric thus gives increased strength to the tread portion of the tire and by spacing the layers from each other with a sufficient body of the resilient material or rubber between them, there is little or no likelihood of the layers becoming separated from the body material carrying them and little or no likelihood of the body material itself disintegrating between or at the points of union with the layers of fabric.

It will be noted that the sinuous layers of fabric not only extend to and form a part of the tread surface of the projections, but they extend deeply into the tread surface, being of greater depth than the depth of the suction chambers or depressions, and as a result of this construction the projecting portions of the tread surface are greatly strengthened, and are firmly anchored to the interior or solid body portion of the tire tread. The spaced sinuous fabric layers, therefore, perform dual functions in the tire, inasmuch as they not only cause the formation of a surface which is an anti-skid surface, but they strengthen and anchor the projections of the tire throughout the whole tread.

What is claimed is:—

1. A tire embodying a hollow body portion and a resilient tread portion having projecting and depressed portions forming the tread surface and having layers of textile fabric arranged edgewise with respect to the tread surface incorporated and vulcanized in place in the projecting portions of the tread, the outer edges of said layers of fabric extending to the surface of the projecting portions, and the inner edges extending into the tire below the bottom level of the depressed portions, there being bodies of resilient tread material between and at each side of said layers of fabric.

2. A tire embodying a hollow body portion and a resilient tread portion having continuous projecting and discontinuous depressed portions forming the tread surface and having continuous layers of textile fabric extending longitudinally of the tread surface incorporated and vulcanized in place in the projecting portions, said layers of fabric being arranged edgewise with respect to the tread surface, the outer edges of said layers extending to the outer surface of the projecting portions, the inner edges of said layers extending into the tire below the bottom level of the depressed portions, there being bodies of resilient tread material between and at each side of said layers of fabric.

3. A tire embodying a hollow body portion and a resilient tread portion having incorporated in said tread portion sinuous layers of fabric arranged edgewise of the tread surface, said layers of fabric extending at one edge to the tread surface and around the tread longitudinally thereof, there being suction chambers in the surface of said resilient tread portion located in the sinuses formed by the fabric layers, said suction chambers being of less depth than the depth of said sinuous layers of fabric whereby the projecting tread portions around the suction chambers are anchored to the body of the tread portion by the fabric layers.

4. A tire embodying a hollow body portion and a resilient tread portion having incorporated in said tread portion sinuous layers of fabric arranged edgewise with respect to the tread surface, said layers of fabric having their outer edges extending to and forming a portion of the tread surface and being spaced apart by the resilient tread material, said layers of fabric extending continuously around the tire longitudinally of the tread, there being suction chambers in the surface of the resilient tread portion located in the sinuses formed by the fabric layers, said suction chambers being of less depth than the depth of the layers of fabric.

5. A tire embodying a hollow body portion and a resilient tread portion having incorporated in said tread portion layers of fabric arranged edgewise with respect to the tread surface, the outer edges of said layers extending to and forming a part of said tread surface, said layers of fabric on opposite sides of the longitudinal center line of the tread being arranged in sinuous lines forming center and side sinuses, there being suction chambers in the surface of the resilient tread material in the center and side sinuses formed by the fabric layers, said suction chambers being of less depth than the depth of the sinuous layers of fabric, whereby the projecting portions of the tread are anchored to the body of the tread by the fabric layers.

WARREN B. BUCKLEY.

Witnesses:
CLAYTON McELROY,
EARL A. WATSON.